Dec. 17, 1957    D. L. ROBINSON ET AL    2,817,026
DYNAMOELECTRIC MACHINE
Filed Oct. 11, 1954
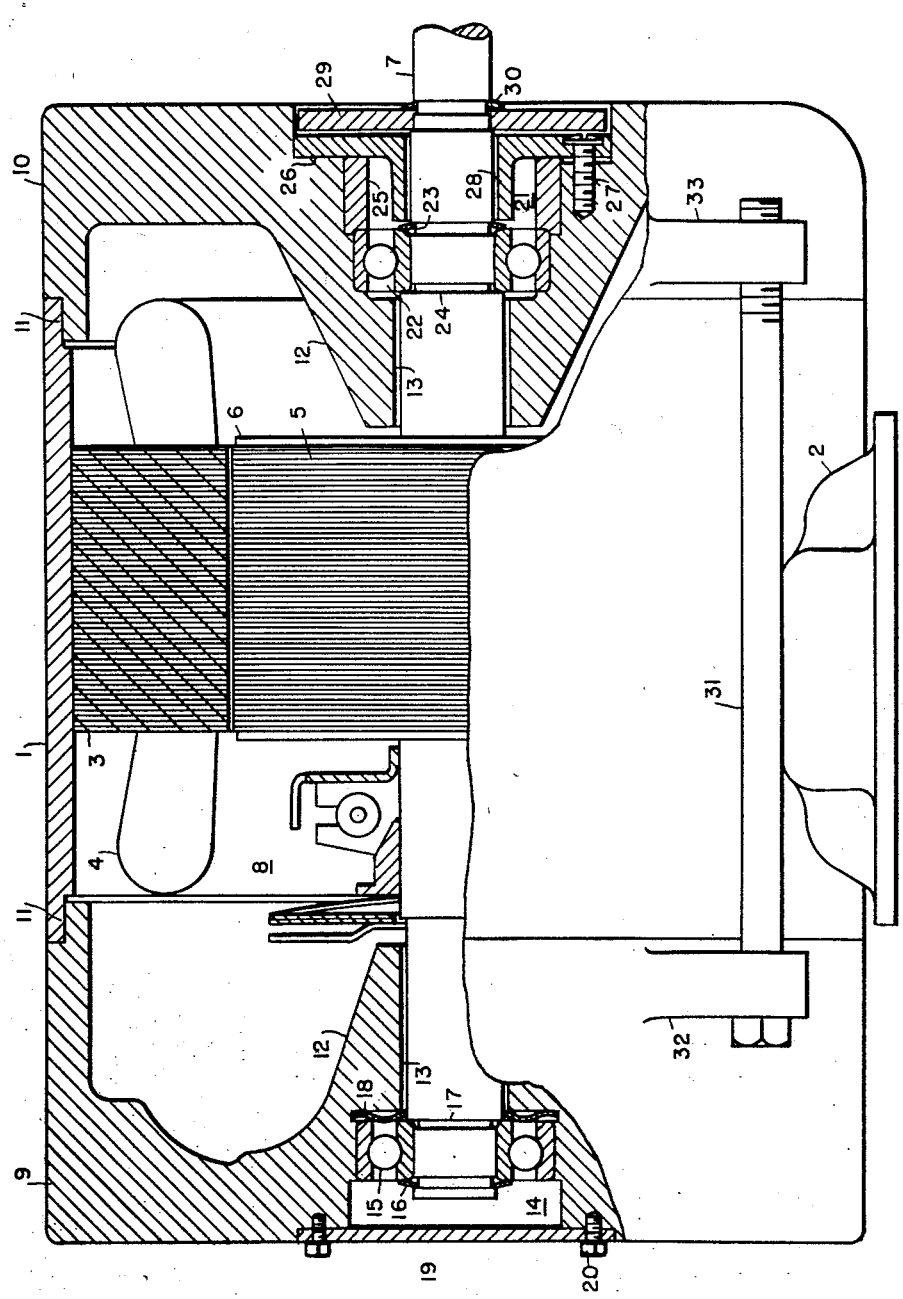
WITNESSES:
E. A. McCloskey.
Leon M. Garman
INVENTORS
Donald L. Robinson
and Richard H. Herman.
BY
ATTORNEY

United States Patent Office 2,817,026
Patented Dec. 17, 1957

2,817,026
DYNAMOELECTRIC MACHINE

Donald L. Robinson and Richard H. Herman, Lima, Ohio, assignors to Westinghouse Electric Corporation, East Pittsburgh, Pa., a corporation of Pennsylvania Application October 11, 1954, Serial No. 461,514

2 Claims. (Cl. 310—88)

The present invention relates to dynamoelectric machines and, more particularly, to the construction of an explosion-proof dynamoelectric machine.

Explosion-proof dynamoelectric machines are used in locations where explosive or inflammable gas, vapor or dust may be present in the surrounding air, and can get into the machine where it may be ignited. Such machines must be built to withstand an internal explosion, and must be designed so that flame or hot gas from an internal explosion cannot reach the outside of the machine without being cooled to a temperature at which the gas or vapor in the surrounding air will not be ignited. This requires long, close fits between adjoining members at all joints, and long, highly restricted flame paths at points where the machine cannot be sealed, such as where the shaft passes through the end bracket, so that any flame or hot gas passing through these paths will be cooled to a safe temperature before reaching the outside.

When such a machine has once been assembled and placed in service, it is undesirable to disturb the explosion-proof joints and flame paths. It is sometimes necessary, however, especially with machine using ball bearings, to obtain access to the bearings for inspection or maintenance, and for replacement, if necessary. In prior constructions of explosion-proof dynamoelectric machines, it has been necessary to remove the end brackets to obtain access to the bearings, and this necessarily involves breaking the explosion-proof joints between the brackets and the frame of the machine, and disturbing the flame paths where the shaft passes through the end bracket. This is highly undesirable, since the explosion-proof characteristics may be impaired when the machine is reassembled.

The principal object of the present invention is to provide an explosion-proof dynamoelectric machine in which the bearings are readily accessible from the outside of the machine, without disturbing the explosion-proof joints or flame paths.

Another object of the invention is to provide a dynamoelectric machine which is easy to assemble in production, and in which the bearings can easily be inspected and replaced, if necessary, without removing the end brackets.

A further object of the invention is to provide a dynamoelectric machine utilizing ball bearings which are readily accessible from the outside of the machine and which are locked in place in a manner which prevents substantial axial movement of the shaft.

Other objects and advantages of the invention will be apparent from the following detailed description, taken in connection with the accompanying drawing, the single figure of which is a view, partly in elevation and partly in longitudinal section, of a machine embodying the invention.

The invention is shown in the drawing, for the purpose of illustration, embodied in an explosion-proof single-phase motor which may, for example, be of the split-phase type. This machine has a frame 1 provided with feet 2, and a laminated stator core 3 is supported in the frame 1. Primary windings 4 of any suitable type are placed in slots in the core 3. The motor has a rotor member which includes a laminated core 5 carrying a secondary winding of any suitable type, shown as a squirrel-cage winding 6, and supported on a shaft 7. The particular motor shown is of the split-phase type, and is provided with a speed-responsive switch of any suitable type, generally designated 8, for controlling the connection of the starting or auxiliary winding. It will be understood, of course, that the switch 8 may be omitted in case the motor is of a type which does not require such a switch.

The motor is closed at each end by end brackets 9 and 10, which are made of relatively massive construction to withstand internal explosion pressures, and which have long, tight fits 11 with the frame 1 to form explosion-proof joints. The brackets 9 and 10 may be secured to the frame in any suitable manner, as by bolts 31 passing through lugs 32 on one bracket and threaded into similar lugs 33 on the other bracket. Each of the brackets 9 and 10 has a central, inwardly extending boss 12 which has a central opening 13 through which the shaft 7 passes. The bosses 12 are relatively long in the axial direction, as shown in the drawing, and the shaft 7 passes through the openings with a very small clearance. The openings 13 thus form long, highly restricted flame paths, so that any flame or hot gas from an internal explosion is cooled to a safe temperature in passing through these openings. The end brackets 9 and 10 may be made of identical construction, if desired, but in the particular motor shown for the purpose of illustration, the bracket 9 at the left-hand end of the motor is made longer than the bracket 10 so as to provide room for the speed-responsive switch 8 and still make the opening 13 of the necessary length.

The end bracket 9 at the left-hand end has a central recess 14 for a ball bearing 15 for the shaft 7. The inner race of the bearing 15 fits snugly on the shaft 7, which is preferably ground to a diameter providing a snug sliding fit. The inner race of the bearing 15 is locked on the shaft by means of a bowed snap ring 16, which engages in a groove in the shaft and locks the bearing against a shoulder 17 on the shaft. The outer race of the bearing 15 fits snugly in the recess 14 and a spring ring 18, of any suitable type, may be provided, if desired, bearing against the outer race to provide an axial force for preloading the bearings, to take up any looseness in the bearings and minimize bearing noise. The outer side of the recess 14 is closed by a plate 19 which is held in place by screws 20, or which may be removably secured to the bracket 9 in any other desired manner.

The bracket 10 at the right-hand end of the motor has a similar recess 21 for receiving a ball bearing 22 for the shaft. The inner race of the bearing 22 has a snug sliding fit on the shaft similar to the bearing 15, and is locked on the shaft by means of a snap ring 23 which locks the bearing against a shoulder 24. The outer race of the bearing fits snugly in the recess 21 and bears against a shoulder on the inner side of the recess. Since it is necessary for the shaft 7 to extend out of the motor at this end of the machine, a labyrinth seal is provided in the bracket to prevent entrance of dust or dirt and leakage of grease from the bearing. The sealing means also includes means for clamping the bearing in place to prevent any substantial axial movement of the shaft. The seal and clamping means includes a tubular spacer member 25 which fits in the recess and engages the outer race of the bearing 22. A plate 26 closes the outer side of the recess and bears against the spacer 25 to clamp the bearing against movement. The plate 26 is removably secured to the bracket by screws 27, or in any other desired manner. The plate 26 has a central sleeve portion 28 surrounding the shaft 7 with a small clearance to form part of the labyrinth seal. The seal is completed by a rotating flinger 29 which is mounted on the shaft 7 outside the plate 26 and locked on the shaft by a snap ring 30 which engages in a groove in the shaft and holds the flinger against a shoulder on the shaft. The flinger 29 is positioned so that there is only a small clearance between the flinger and the plate 26, thus forming an effective labyrinth seal in cooperation with the sleeve portion 28. The radial clearance between the outer edge of the flinger and the bracket is also made very small, to form an effective part of the labyrinth path.

It will be seen that the bearings 15 and 22 are disposed in recesses in the end brackets outside the flame paths 13, so that the bearings are accessible from the outside of the motor without removing the end brackets and without disturbing the explosion-proof joints or flame paths. Thus, the bearing 15 at the left-hand end is easily accessible for inspection by taking off the plate 19, and it can be removed for replacement, if necessary, merely by removing the snap ring 16. The bearing 22 at the right-hand end is also easily accessible by removing the snap ring 30, so that the flinger 29 can be removed, and by taking off the plate 26. The bearing can then easily be removed for replacement by removing the snap ring 23. It will be seen that the bearings are easily accessible from the outside of the motor without requiring removal of the end brackets. If it is desired to have the shaft 7 extend from the machine at both ends, the labyrinth construction described in connection with the end bracket 10 can obviously be utilized in both brackets, although with the spacer 25 preferably omitted at one end. The recesses 14 and 21 may be filled with grease for lubrication of the bearings, and, if desired, lubricating means of any suitable type might be provided for supplying grease to the bearings.

It should now be apparent that an explosion-proof dynamoelectric machine has been provided in which the bearings are readily accessible for inspection or replacement without disturbing the explosion-proof joints or flame paths. The construction is obviously applicable to machines of any type or size, and it is not necessarily restricted to explosion-proof machines, but may be applied to any type of machine where it is desirable to obtain access to the bearings without removing the end brackets. This construction also provides a motor which is easy to assemble in production, as well as being easy to service, since the bearings can be put in place after the rotor and end brackets are assembled in the machine, and the bearings are secured on the shaft in a simple and inexpensive manner. It will also be noted that the bearings are mounted and clamped in a manner which prevents any substantial axial movement of the shaft, although one bearing can move with the shaft to allow differential expansion between the shaft and brackets when the motor becomes heated during operation.

A particular embodiment of the invention has been shown and described for the purpose of illustration, but it will be obvious that various modifications and other embodiments are possible and are within the scope of the invention.

We claim as our invention:

1. A dynamoelectric machine having a stator member and rotor member, the stator member having an end bracket at each end, the end brackets having central openings and the rotor member having a shaft passing through the openings in the end brackets, said openings providing long passages enclosing the shaft with highly restricted clearance, recesses in the brackets outside said passages, ball bearings for the shaft disposed in said recesses, and removable means for closing the outer sides of the recesses, at least one of said closing means comprising a plate removably secured to the bracket within the recess and having a sleeve portion enclosing the shaft with a small clearance, spacer means in the recess extending between the plate and the bearing to clamp the bearing in place, and a flinger member removably mounted on the shaft outside the plate and positioned in the recess closely adjacent the plate with a small clearance therebetween and with a small clearance between the periphery of the flinger member and the bracket.

2. A dynamoelectric machine having a stator member and a rotor member, the stator member having an end bracket at each end, the end brackets having inwardly extending bosses and the rotor member having a shaft extending through central openings in the bosses, said openings providing long passages enclosing the shaft with highly restricted clearance, recesses in the brackets outside said passages, ball bearings for the shaft disposed in said recesses, and removable means for closing the outer sides of the recesses, at least one of said closing means comprising a plate removably secured to the brackets within the recess and having a sleeve portion enclosing the shaft with a small clearance, spacer means in the recess extending between the plate and the bearing to clamp the bearing in place, and a flinger member removably mounted on the shaft outside the plate and positioned in the recess closely adjacent the plate with a small clearance therebetween and with a small clearance between the periphery of the flinger member and the bracket.

References Cited in the file of this patent

UNITED STATES PATENTS

| 1,941,335 | Averrett | Dec. 26, 1933 |
| 2,070,718 | Ehrlich | Feb. 16, 1937 |
| 2,635,198 | Wieseman | Apr. 14, 1953 |
| 2,650,992 | Forss | Sept. 1, 1953 |

FOREIGN PATENTS

| 401,031 | Great Britain | Nov. 9, 1933 |